United States Patent

Svedberg et al.

[11] Patent Number: 5,929,371
[45] Date of Patent: Jul. 27, 1999

[54] HEAT SHIELDS FOR ALKALI METAL THERMAL TO ELECTRIC CONVERSION (AMTEC) CELLS

[75] Inventors: Robert Carl Svedberg, Pinckney; Robert K. Sievers, Ann Arbor, both of Mich.; Chris A. Borkowski, Adelphi, Md.; Terry J. Hendricks, Saline, Mich.

[73] Assignee: Advanced Modular Power Systems, Inc., Ann Arbor, Mich.

[21] Appl. No.: 08/901,554

[22] Filed: Jul. 28, 1997

[51] Int. Cl.$^6$ .................................................. H01L 35/28
[52] U.S. Cl. ............................................................ 136/204
[58] Field of Search ................................... 136/205, 212, 136/203, 204; 429/17, 112

[56] References Cited

U.S. PATENT DOCUMENTS

| | | | |
|---|---|---|---|
| 3,944,438 | 3/1976 | Hursen et al. | 136/202 |
| 3,989,546 | 11/1976 | Purdy et al. | 136/202 |
| 4,098,958 | 7/1978 | Bettman | 429/17 |
| 4,808,240 | 2/1989 | Sievers | 136/202 |
| 4,948,679 | 8/1990 | Hunt et al. | 429/11 |
| 5,085,948 | 2/1992 | Tsukamoto et al. | 429/11 |
| 5,228,922 | 7/1993 | Sievers | 136/202 |

OTHER PUBLICATIONS

"Performance Analysis of a Multitube Vapor–Anode AMTEC Cell", Tournier, Jean–Michel, El–Genk, Mohamed S., Huang, Lianmin, and Schuller, Michael, Institute for Space and Nuclear Power Studies, Dept. of Chemical and Nuclear Engineering, The University of New Mexico Albuquerque, NM, and Power Systems Branch, Phillips Laboratory, Kirtland AFB, Albuquerque, NM, Document No. 97–378. No Date Available.

"Thermal Modeling of High Efficiency AMTEC Cells", Ivanenok, Joseph F. III, Sievers, R.K., and Crowley, C.J., Advanced Modular Power Systems, Inc., Ann Arbor, MI, and Creare, Inc., Hanover NH. No Date Available.

"The Effect of Radiation Shields on Power and Efficiency of an Internally Heated AMTEC Cell", Weber, Neill, Rasmussen, James R., Olsen, Scott L., Beta Power, Inc., Document No. 929147. No Date Available.

(List continued on next page.)

*Primary Examiner*—Kathryn Gorgos
*Assistant Examiner*—Erica Smith-Hicks
*Attorney, Agent, or Firm*—Harness, Dickey & Pierce, PLC

[57] ABSTRACT

The present invention provides an alkali metal thermal to electric conversion (AMTEC) cell of the type employing an alkali metal flowing between a high-pressure zone and low-pressure zone in the cell through a solid electrolyte structure. The cell preferably includes a condenser communicating with the low-pressure zone for condensing alkali metal vapor migrating through the low-pressure zone from the solid electrolyte structure. An artery is coupled to the condenser for directing condensed alkali metal from the condenser toward a hot end of the cell. An evaporator for evaporating the condensed alkali metal is coupled to the artery and communicates with the high-pressure zone. A heat shield is disposed in the low pressure zone of the cell for reducing the radiative heat transfer between the hot end of the cell and the cold end of the cell. The heat shield preferably includes a first end having a known area transitioning to a second end encompassing a smaller area than the first end.

17 Claims, 4 Drawing Sheets

OTHER PUBLICATIONS

"Parasitic Heat Loss Reduction in AMTEC Cells By Heat Shield Optimization", Borkowski, C.A., Svedberg, R.C., and Hendricks, T.J., Advanced Modular Power Systems, Inc., Ann Arbor, MI, Document No. 97420. No Date Available.

"Series II AMTEC Cell Design and Development", Sievers, R.K., Pantolin, Jan E., Svedberg, R.C., Butkiewicz, David A., Huang, C., Hendricks, T.J., and Hunt, T.K., Advanced Modular Power Systems, Inc., Ann Arbor, MI, Document No. 97335. No Date Available.

"Vacuum Testing of High Efficiency Multi–Tube AMTEC Cells", Merril, John M., Schuller, Michael J., Sievers, Robert, Borkowski, Chris, Huang, Lianmin, and El–Genk, Mohamed S., Nichols Research Corporation, Albuquerque, NM, Phillips Laboratory/VTVP, Kirtland AFB, NM, Advanced Modular Power Systems, Inc., Ann Arbor, MI and Institute for Space Nuclear Power Studies, The University of New Mexico, Albuquerque, NM. No Date Available.

"Micromachined Evaporator for AMTEC Cells", Izenson, Michael G., and Crowley, Christopher J., Creare, Inc., Hanover, NH, Document No. 93221, © American Chemical Society, 1993. No Month Available.

"A Five Volt AMTEC Multicell", Underwood, Mark L., Suitor, Jerry W., Williams, Roger M., Ryan, Margaret A., Jeffries–Nakamura, Barbara, and O'Connor, Dennis, Jet Propulsion Laboratory, Pasadena, CA, Document No. 93471, © American Chemical Society, 1993. No Month Available.

"Component Selection, Accelerated Testing, and Improved Modeling of AMTEC Systems for Space Power", Williams, R.M., Jeffries–Nakamura, Barbara, Ryan, Margaret A., Underwood, Mark L. Suitor, Jerry W., and O'Connor, Dennis, Jet Propulsion Laboratory, California Institute of Technology, Pasadena, CA, Document No. 93197, © American Chemical Society, 1993. No Month Available.

"Emissivities and Thermal Characterization of Components for AMTEC Cells", Ryan, Margaret A., Kisor, A., Williams, R.M., Jeffries–Nakamura, Barbara, Underwood, Mark L., and O'Connor, Dennis, Jet Propulsion Laboratory, California Institute of Technology, Pasadena, CA, Document No. 93322, © American Chemical Society, 1933. No Month Available.

"Research Program on a One KWe Sodium Heat Engine (SHE) System—Final Technical Report for Phase 5", Hunt, Thomas K., Ford Motor Company Research Staff, Dearborn, MI, Sep. 18, 1989.

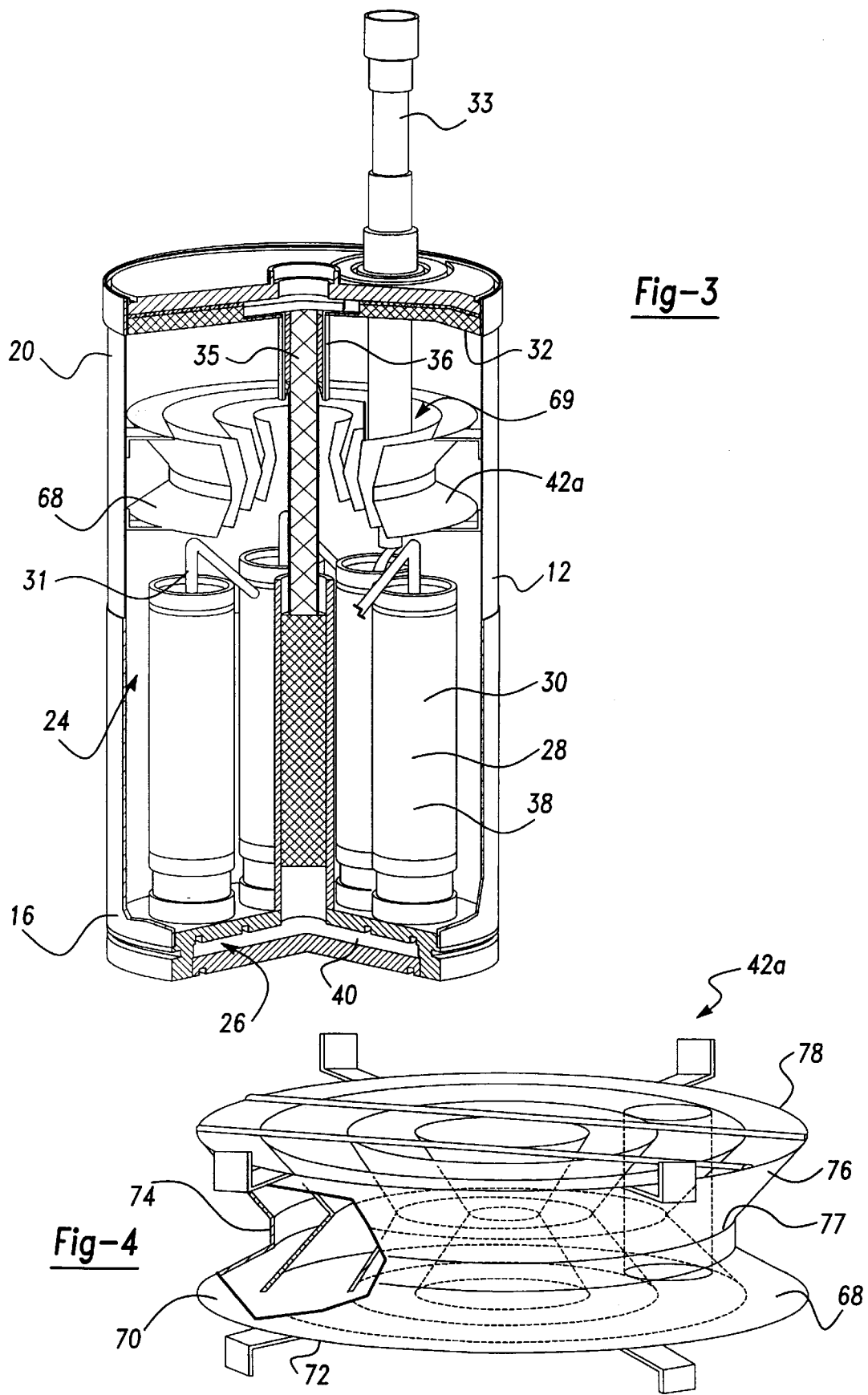

U.S. Patent    Jul. 27, 1999    Sheet 4 of 4    5,929,371

# HEAT SHIELDS FOR ALKALI METAL THERMAL TO ELECTRIC CONVERSION (AMTEC) CELLS

BACKGROUND OF THE INVENTION

1. Technical Field

The present invention generally relates to alkali metal thermal to electric conversion (AMTEC) cells and more particularly to a heat shield for such a cell for reducing the radiative heat transfer between the heat input zone of the cell and the heat rejection zone of the cell.

2. Discussion

An AMTEC cell is a thermally regenerative concentration cell typically utilizing an alkali metal, such as sodium or potassium, as a working fluid and a solid electrolyte as an ion selective membrane. While throughout this description sodium is referred to as the working fluid, it is to be understood that other alkali metals are also applicable to this invention. The electrolyte separates the cell into a high pressure zone and a low pressure zone while permitting a nearly isothermal expansion of the alkali metal for generating high-current/low voltage power at high efficiency. To accomplish this, most AMTEC cells employ at least one beta-alumina type solid electrolyte (BASE) element, commonly shaped as a tube, which is exposed to high-pressure sodium on one surface and low-pressure sodium on an opposite surface. A high-temperature evaporator near the "hot" end of the cell produces the high pressure and a low-temperature condenser at the "cold" end of the cell maintains the low-pressure.

The BASE element's opposed surfaces are overlaid with permeable electrodes which are connected to each other through an external load circuit. Neutral sodium atoms incident on one of the BASE element's surfaces release their electrons to one electrode (the anode). The resulting sodium ions pass through the element wall under the applied pressure gradient, and the emerging sodium ions are neutralized at the other electrode (the cathode) by electrons returning from the external load. As such, the pressure gradient drives the sodium through the BASE element thereby creating an electrical current which passes through the external load resistance.

The neutral sodium vapor at the outer electrodes migrates through the chamber between the BASE element and the cell wall until it condenses at the low-temperature condenser at the cold end of the cell. From there, the sodium condensate flows through an artery containing a fine pore membrane commonly consisting of a packed metallic felt toward the high pressure zone at the hot end of the cell. The liquid sodium evaporates at the high temperature evaporator which is coupled to the artery and is returned to the inside of the BASE element through a common plenum at the hot end of the cell.

The heat transfer that occurs between the heat input zone of the cell proximate the hot end and the heat rejection zone of the cell proximate the cold end, other than the latent heat of the working fluid condensing at the cold end of the cell, is referred to as parasitic heat transfer. In a typical AMTEC cell operating at two amperes of electrical current, the percentage of the energy that is parasitic in nature is approximately 48%. Of this parasitic energy, approximately 12.5% is radiative heat transfer directly to the condenser surface and approximately 87.5% is conductive heat transfer from the cell wall to the condenser surface.

It has now been found that cell performance can be enhanced by lowering the radiative heat transfer between the heat input zone of the cell and the heat rejection zone of the cell. Cell performance can also be enhanced by increasing the operating temperature of the BASE element. Therefore, it would be desirable to provide a heat shield for reducing the amount of radiative heat transfer between the hot and cold ends of the cell while increasing the cell efficiency by raising the temperature of the BASE element.

SUMMARY OF THE INVENTION

The above and other objects are provided by an alkali metal thermal to electric conversion (AMTEC) cell of the type employing an alkali metal flowing between a high-pressure zone and low-pressure zone in the cell through a solid electrolyte structure. The cell preferably includes a condenser communicating with the low-pressure zone for condensing alkali metal vapor migrating through the low-pressure zone from the solid electrolyte structure. An artery is coupled to the condenser for directing condensed alkali metal from the condenser toward a hot end of the cell. An evaporator for evaporating the condensed alkali metal is coupled to the artery and communicates with the high-pressure zone. A heat shield is disposed in the low pressure zone of the cell to reduce the radiative heat transfer between the hot end of the cell and the cold end of the cell. The heat shield preferably includes a first end having a known area transitioning to a second end having a smaller area than the first end. For instance, in one embodiment of the present invention, the heat shield comprises a cylindrical member including a first tubular conduit transitioning through a frusto-conical nozzle to a second, smaller diameter tubular conduit. In a second embodiment of the present invention, the heat shield comprises a converging/diverging member including an array of coaxially arranged, converging/diverging members which include an inlet end, a smaller middle portion and an outlet end. In a third embodiment of the present invention, the heat shield comprises a combination of the cylindrical member and the converging/diverging members. In a fourth embodiment of the present invention, the heat shield comprises a disk-shaped porous member.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 3 is a perspective view in partial cross-section of an AMTEC cell having a heat shield according to a second embodiment of the present invention;

FIG. 4 is a more detailed perspective view of the heat shield of FIG. 3;

DETAILED DESCRIPTION OF THE PREFERRED EMBODIMENTS

The present invention is directed towards an alkali metal thermal to electric conversion (AMTEC) cell having a heat shield disposed in the low pressure zone between the hot and cold ends of the cell. The heat shield reduces the radiative heat transfer between the heat input zone of the cell and the heat rejection zone of the cell. Additionally, the heat shield increases the temperature of the BASE element which allows the evaporator temperature to be increased without risk of sodium condensation on the BASE element electrodes. As such, the power output and efficiency of the cell is enhanced. Although four specific embodiments of the heat shield are described below, one skilled in the art will appreciate that these embodiments are merely exemplary of the types of heat shields to which the present invention is directed.

Figures 1, 2:
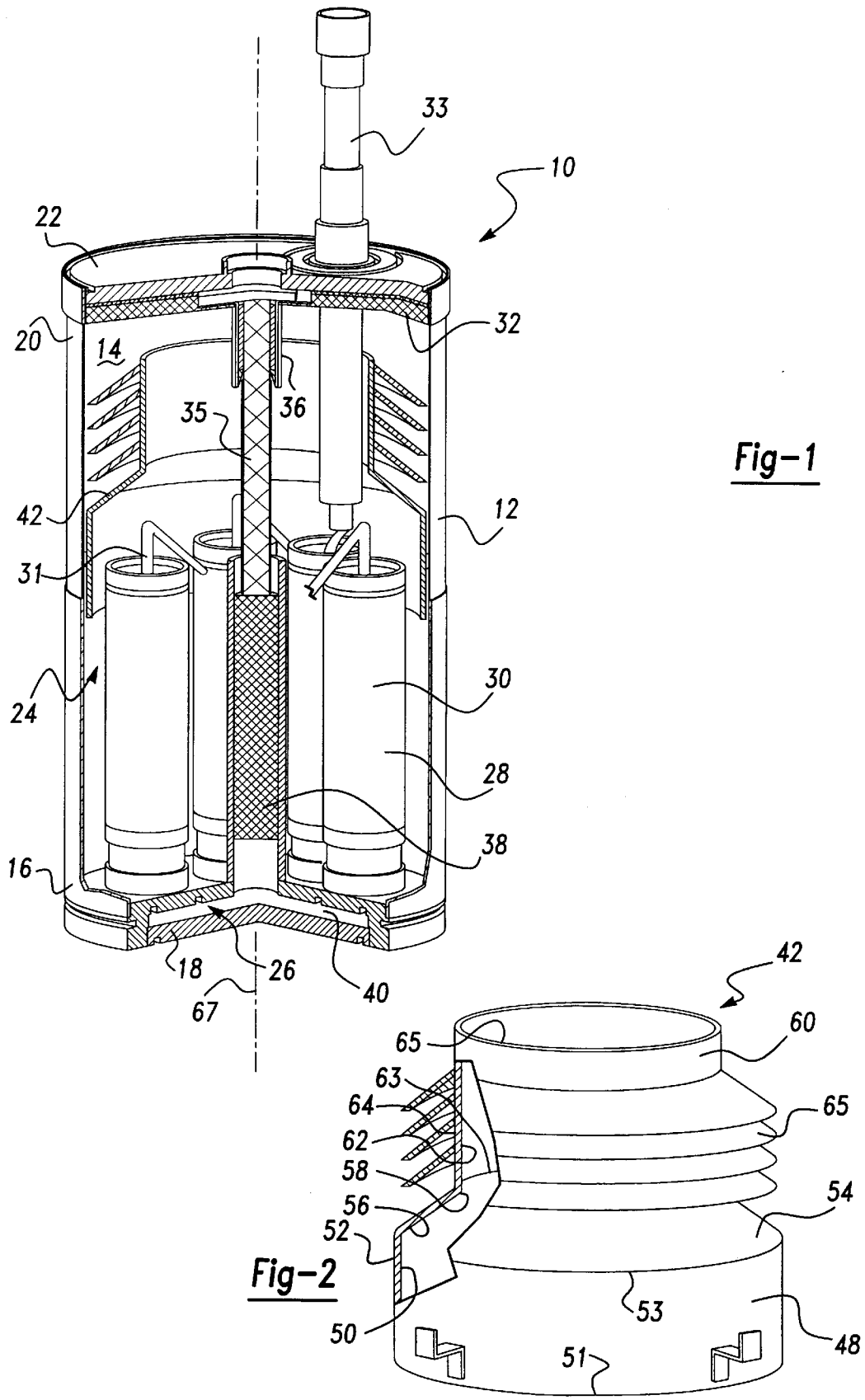
FIG. 1 is a perspective view in partial cross-section of an AMTEC cell having a heat shield disposed in the low-pressure zone in accordance with the teachings of the present invention.
FIG. 2 is a more detailed perspective view the heat shield of FIG. 1.

Turning now to the figures, an AMTEC cell 10 incorporating the teachings of the present invention is illustrated in FIG. 1. The AMTEC cell 10 includes a cell wall 12 defining a chamber 14 which is closed at a first end 16 by a first end cap 18. The first end 16 is generally known in the art as the hot end of the cell 10 and defines a first boundary of the heat input zone of the cell 10. The chamber 14 is also closed at a second end 20 by a second end cap 22. The second end 20 is generally known in the art as the cold end of the cell 10 and defines a boundary of the heat rejection zone of the cell 10.

The chamber 14 is separated into a low-pressure zone 24 and a high pressure zone 26 by a solid electrolyte structure 28. In the illustrated embodiment, the solid electrolyte structure 28 includes a plurality of beta-alumina type solid electrolyte (BASE) tubes 30 electrically connected in series by leads 31. The leads 31 are coupled to a terminal 33 projecting exterior of the cell 10 which enables power output from the cell 10. Although the BASE tubes 30 are shown, it is to be understood that the present invention is also suitable for use in conjunction with solid electrolyte structures of other configurations such as flat plates.

A condenser 32 is coupled to the cell wall 12 about its periphery adjacent the second end cap 22. As such, the condenser 32 communicates with the low-pressure zone 24. An artery 35, preferably packed with metallic felt, is coupled to the condenser 32 by a mounting member 36. The artery 35 extends from the condenser 32 through the low-pressure zone 24 towards the hot end 16 of the cell 10. The artery 35 is connected to an evaporator 38 which communicates with the high-pressure zone 26. A common plenum 40 adjacent the hot end 16 of the cell 10 interconnects the evaporator 38 and the high-pressure side of the solid electrolyte structure 28. A heat shield 42, described in greater detail below, is coupled to the cell wall 12 in the low-pressure zone 24.

According to the above configuration, neutral sodium atoms incident on the high pressure side of the electrolyte structure 28 release their electrons to an inner electrode. The resulting sodium ions pass through the solid electrolyte structure 28 under an applied pressure gradient and the emerging sodium ions are neutralized at an outer electrode by electrons returning from the external load. The neutral sodium atom vapor at the outer electrode migrates through the low-pressure zone 24 and condenses at the condenser 32. The sodium condensate flows downward through the artery 35 to the high temperature evaporator 38. The liquid sodium evaporates at the evaporator 38 and the high-pressure sodium vapor is returned to the high-pressure side of the solid electrolyte structure 28 through the plenum 40 completing the cycle.

Turning now to FIG. 2, a first embodiment cylindrical heat shield 42 is shown in greater detail. The heat shield 42 includes a first tubular conduit 48 having a radial inner surface 50 and a radial outer surface 52 between first and second circular ends 51 and 53. The first tubular conduit 48 is coupled to or is formed integrally with a frusto-conical nozzle 54 at the second end 53. The frusto-conical nozzle 54 includes a circular inlet end 56 converging to a smaller diameter circular outlet end 58. The frusto-conical nozzle 54 is coupled to or is formed integral with a second tubular conduit 60 at its outlet end 58. The tubular conduit 60 includes an inner radial surface 62 and an outer radial surface 64 between circular inlet and outlet ends 63 and 65. Preferably, the area encompassed by the inner radial surface 62 of the second tubular conduit 60 is smaller than the area encompassed by the inner radial surface 50 of the first tubular portion 48. A plurality of conical members 65 are coupled to the second tubular conduit 60 in an overlapping configuration circumferentially about the outer radial surface 64.

Preferably, the heat shield 42 is mounted within the low pressure zone by brazing or otherwise fixedly securing the first tubular conduit 48 to the interior of the cell wall 12 (FIG. 1) periodically about its perimeter. However, other means for mounting the heat shield 42 may also be employed. It should be noted that the heat shield 48 is preferably positioned within the cell 10 such that the outlet end 58 of the frusto-conical nozzle 54 is not located so close to the solid electrolyte structure 28 as to cause wicking therebetween. Also, it is preferred that the heat shield 42 be coaxially aligned with a central, longitudinal axis 67 of the cell 10.

Referring now to FIG. 3, a second embodiment converging/diverging heat shield 42a is illustrated. The remaining elements of the cell 10 are identical to that of FIG. 1 and therefore will not be repeated here. In this embodiment, the heat shield 42a is formed as a plurality of coaxially located, radially spaced apart, converging/diverging chevrons (i.e., V-shaped members) 68 disposed in the low pressure zone 24 of the cell 10. Preferably, the heat shield 42a is brazed or otherwise fixedly secured to the interior of the cell wall 12 periodically about its perimeter and includes a bore 69 for the terminal 33. Also, the heat shield 42a is preferably located at a position in the low-pressure zone 24 of the cell 10 where wicking between the heat shield 42a and the solid electrolyte 28 is avoided.

The second embodiment heat shield 42a is illustrated in greater detail in FIG. 4. The heat shield 42a includes a series of progressively smaller diameter, coaxially aligned, spaced apart, first inverted V-shaped chevrons 70 having a circular inlet end 72 converging to a circular collar 74, which has a smaller diameter than the inlet end 72. The heat shield 42a also includes a second series of progressively smaller diameter, coaxially aligned, spaced apart, V-shaped chevrons 76 coupled to or formed integral with the first chevrons 70. The second chevrons 76 include a first circular end 77 mating with the collar 74 and a circular outlet end 78. The outlet end 78 has a greater diameter than the collar 74.

Preferably, the area encompassed by the inlet end 72 and the area encompassed by the outlet end 78 are substantially equal. This yields an overall converging/diverging configuration to the heat shield 42a.

Figure 5:
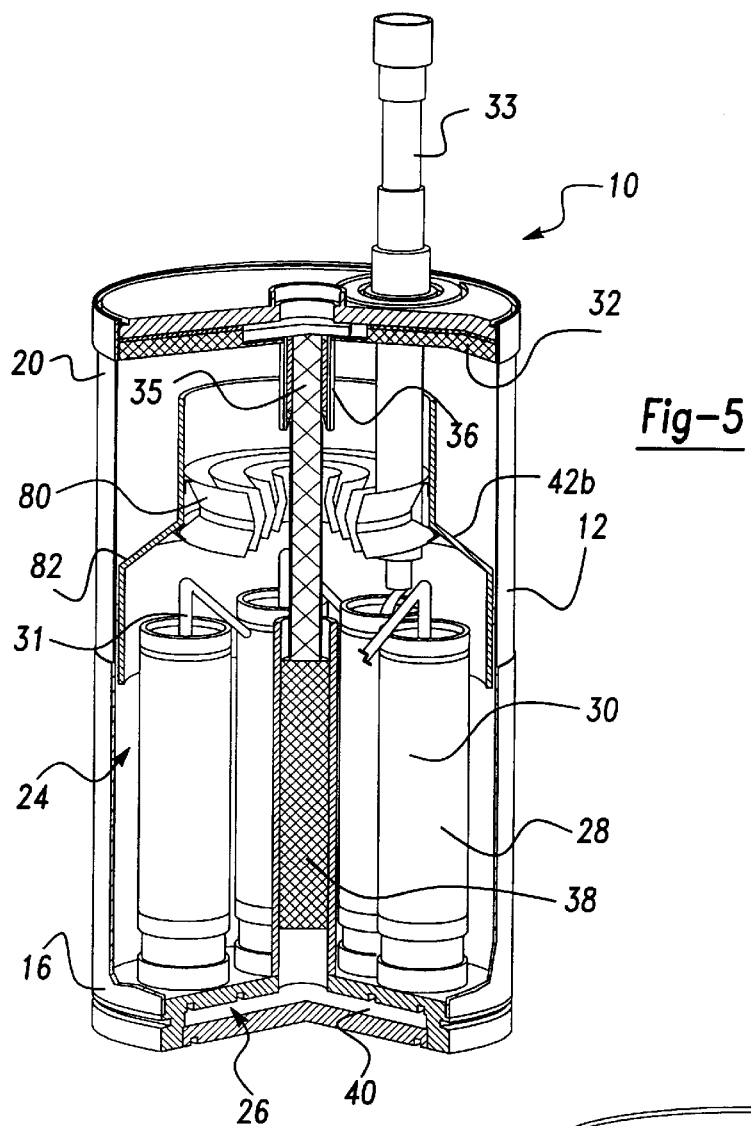
FIG. 5 is a perspective view in partial cross-section of an AMTEC cell having a heat shield according to a third embodiment of the present invention.

Turning now to FIG. 5, a third embodiment cylinder/chevron heat shield 42b is depicted. The remaining elements of the cell 10 are identical to that of FIGS. 1 and 3 and are indicated with like numerals. The heat shield 42b includes a combination of the first embodiment cylindrical heat shield 42 and the second embodiment converging/diverging heat shield 42a. In this case, a converging/diverging member 80 is anchored by brazing or other means to the interior radial surface of a cylindrical member 82 which is secured to the cell wall 12.

Figure 6:
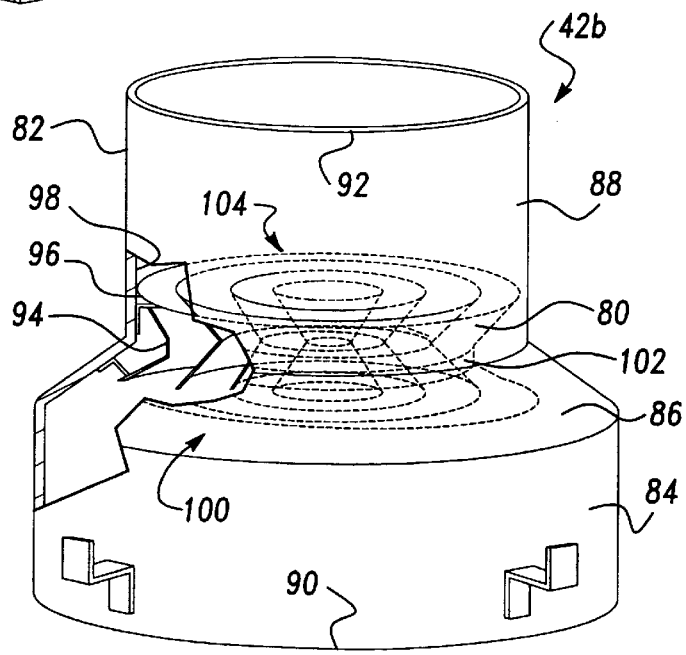
FIG. 6 is a more detailed perspective view of the heat shield of FIG. 5.

The third embodiment heat shield 42b is shown in greater detail in FIG. 6. The heat shield 42b includes a first tubular conduit 84 coupled to or integrally formed with a frusto-conical nozzle 86. The frusto-conical nozzle 86 is coupled to or integrally formed with a second tubular conduit 88. As such, the inlet end 90 of the first tubular conduit 84 transitions through the frusto-conical nozzle 86 to a smaller diameter exit end 92 of the second tubular conduit 88.

The heat shield 42b also includes a plurality of progressively smaller diameter, coaxially aligned, spaced apart, converging/diverging members 94 secured within the second tubular conduit 88 of the cylindrical member 82. In this case, a radial outer surface 96 of the converging/diverging member 80 is coupled, preferably by brazing, to a radial inner surface 98 of the cylindrical member 82. The converging/diverging member 80 includes a circular inlet end 100 having a first diameter converging to a collar 102 having a reduced diameter. The converging/diverging member 82 diverges from the collar 102 to an exit end 104 having a diameter greater than that of the collar 102.

Figure 7:
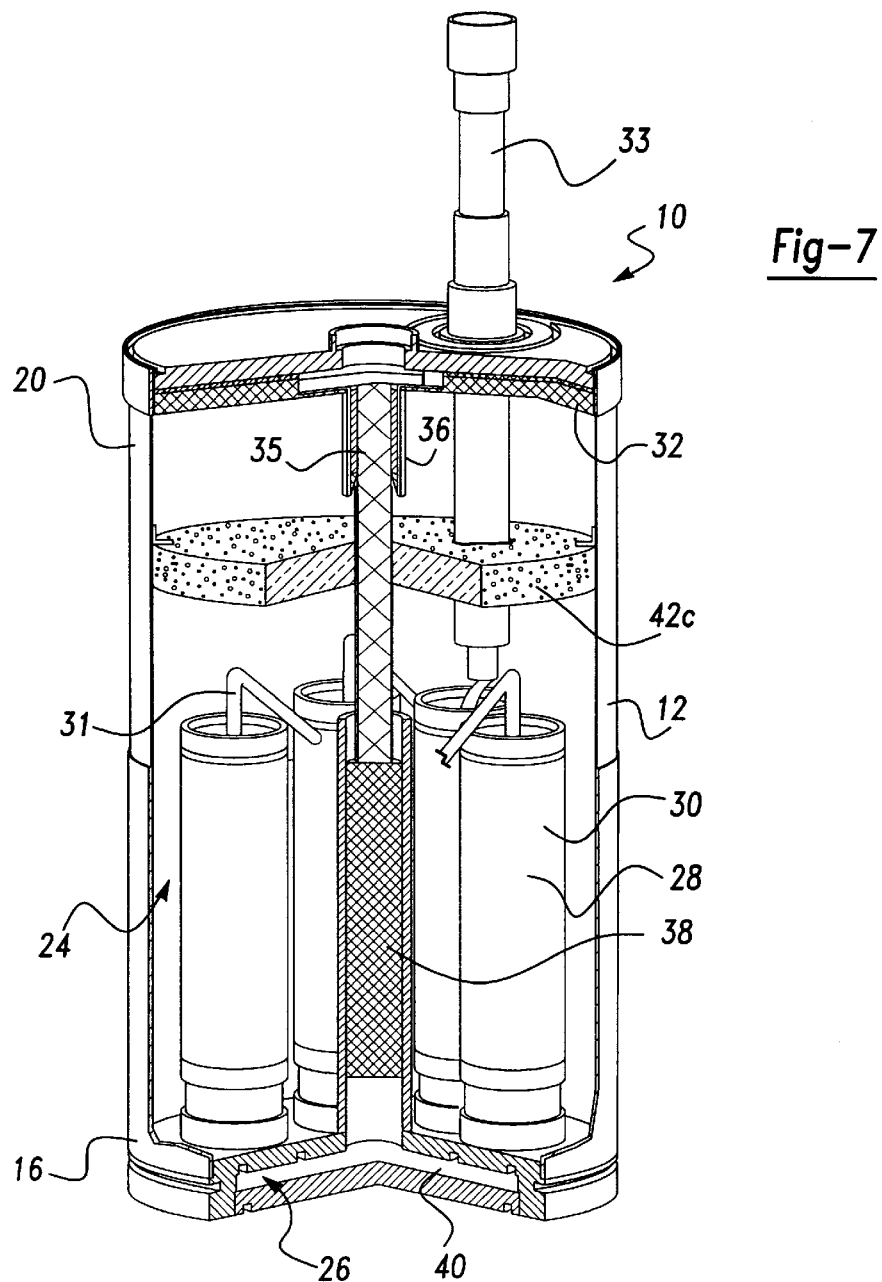
FIG. 7 is a perspective view in partial cross-section of an AMTEC cell having a heat shield according to a fourth embodiment of the present invention.

A fourth embodiment disk heat shield 42c is illustrated in FIG. 7. In this embodiment, the heat shield 42c consists of a porous, disk shaped member suspended in the low pressure zone 24 of the cell 10. The shield 42c preferably is formed of a ceramic material compatible with the working fluid in the cell 10. Alternatively, the shield 42c may consist of a metal, a ceramic coated metal, or sintered material compatible with the working fluid.

Figure 8:
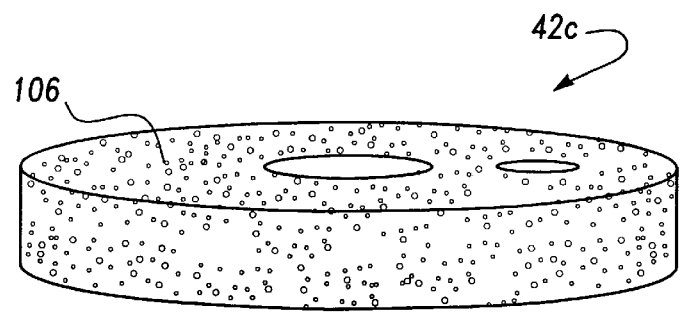
FIG. 8 is a more detailed perspective view of the heat shield of FIG. 7.

As best seen in FIG. 8, the fourth embodiment heat shield 42c includes a plurality of pores or openings 106 therein which minimizes the vapor flow restriction imposed by the heat shield 42c on the migration of the sodium vapor. However, due to the structural configuration of the heat shield 42c and the material composition thereof, the radiative heat transfer between the heat input zone near the hot end 16 and the heat rejection zone near the cold end 20 of the cell 10 is reduced.

Referring now collectively to all of the figures, in operation, radiative heat migrating from the heat input zone near the hot end 16 of the cell 10 towards the heat rejection zone near the cold end 20 is intercepted by the heat shield 42. As such, a percentage of the heat which would normally radiate to the condenser 32 is absorbed by the heat shield 42. Accordingly, the radiative heat transfer between the hot end 16 of the cell 10 and the cold end 20 of the cell 10 is reduced.

Additionally, the heat shield 42 effects the temperature gradient within the cell 10 between the hot end 16 and cold end 20. That is, with the heat shield 42 in place, the mean temperature of a first region within the low pressure zone 24 adjacent to the solid electrolyte 28 is higher than in the absence of the heat shield 42. Similarly, the temperature of a second region in the low pressure zone 24 remote from the solid electrolyte 28 is lower than in the absence of the heat shield 42. Due to the higher temperature region adjacent the solid electrolyte 28, the temperature of the evaporator 38 may be raised while maintaining the required temperature differential between the solid electrolyte 28 and the evaporator 38 so that condensation of alkali metal vapor on the interior of the solid electrolyte 28 is avoided.

It should be noted that the present invention reduces the total heat transfer within the cell to a different extent depending upon the initial temperature of the hot end of the cell and the initial temperature of the cold end of the cell, i.e., the temperature difference between the cell ends. Analytical results indicate that the cylindrical embodiment and the converging/diverging embodiment of the heat shield reduce parasitic heat transfer within the cell by approximately 25%. The cylindrical embodiment has been found to reduce total heat transfer more than the converging/diverging embodiment. Therefore, from the standpoint of heat transfer minimization, the cylindrical embodiment is presently preferred. It should also be noted that the heat shield of the present invention tends to increase the conductive heat transfer to the cold end of the cell. However, due to the reduction in radiative heat transfer, the overall heat transfer within the cell is reduced significantly. The skilled artisan will likely recognize that reducing the emissivity of the heat shields and the cell walls also reduces radiative heat loss. Therefore, material selective and/or coatings should be at least partially driven by emissivity considerations.

Thus, the present invention provides an AMTEC cell having an apparatus for reducing the radiative heat transfer between the heat input zone of the cell and the heat rejection zone of the cell. In one embodiment of the present invention, a cylindrical type heat shield is utilized for this purpose. In a second embodiment of the present invention, a converging/diverging type heat shield is employed. In a third embodiment of the present invention, a combination cylindrical and converging/diverging heat shield is used. In a fourth embodiment, a disk-shaped, porous member is utilized. According to each embodiment, radiative heat transfer from the hot end of the cell to the cold end of the cell is reduced.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An alkali metal thermal to electric conversion (AMTEC) cell employing an alkali metal flowing between a hot end of the cell and a cold end of the cell through a solid electrolyte structure which separates the cell into a low pressure zone and a high pressure zone, said cell comprising:

a chamber having first and second ends and a volume therebetween;

a first end cap coupled to said first end of said chamber;

a second end cap coupled to said second end of said chamber, said chamber and said first and second end caps enclosing said volume;

a condenser disposed within said chamber proximate said first end cap and communicating with said low pressure zone for condensing alkali metal vapor migrating through said low pressure zone from said solid electrolyte structure;

an evaporator disposed within said chamber proximate said second end cap for evaporating said condensed alkali metal into said high pressure zone;

an artery interconnecting said condenser and said evaporator for directing said condensed alkali metal from said condenser towards said evaporator; and a heat shield coupled to said cell within said volume in said low pressure zone for reducing radiative heat transfer between said hot end of said cell and said cold end of said cell, wherein said heat shield is formed with folds to block said radiative heat transfer and create flow paths to allow the passage of said alkali metal.

2. The AMTEC cell of claim 1 wherein said heat shield further comprises a member having a first end encompassing a first known area converging to a second end encompassing a second known area.

3. The AMTEC cell of claim 2 wherein said second known area is less than said first known area.

4. The AMTEC cell of claim 3 wherein said member includes a third end encompassing a third known area, said third known area being different from said second known area.

5. The AMTEC cell of claim 4 wherein said third area is substantially equal to said first area and said second area is less than said first area and said third area.

6. The AMTEC cell of claim 1 wherein said heat shield further comprises a member having a cross-sectional dimension decreasing from a first end to a second end.

7. The AMTEC cell of claim 6 wherein said member further comprises:

a first tubular conduit having a first inner radial surface encompassing a first known area;

a frusto-conical nozzle coupled at a first end to said first tubular conduit; and a second tubular conduit coupled to a second end of said frusto-conical nozzle, said second tubular conduit having a second inner radial surface encompassing a second known area, said second known area being less than said first known area.

8. The AMTEC cell of claim 1 wherein said heat shield further comprises a chevron shaped member.

9. The AMTEC cell of claim 1 wherein said heat shield further comprises a chevron shaped member coupled to an inverted chevron shaped member.

10. The AMTEC cell of claim 9 wherein said heat shield further comprises a plurality of coaxially aligned, radially spaced, converging/diverging members.

11. The AMTEC cell of claim 1 wherein said heat shield further comprises:

a first tubular conduit;

a frusto-conical nozzle coupled at a first end to said first tubular conduit;

a second tubular conduit coupled to a second end of said frusto-conical nozzle; and a converging/diverging member coupled to one of the group consisting of said first tubular conduit and said second tubular conduit.

12. The AMTEC cell of claim 11 wherein said converging/diverging member is coupled to an inner radial surface of said second tubular conduit, said second tubular conduit having a diameter less than a diameter of said first tubular conduit.

13. The AMTEC cell of claim 1 wherein said heat shield further comprises a substantially disk shaped porous member.

14. The AMTEC cell of claim 13 wherein said disk shaped porous member further comprises one of the group consisting of ceramic, metal, ceramic coated metal and sintered material.

15. The AMTEC cell of claim 1 wherein said heat shield is coupled about its perimeter to said chamber.

16. The AMTEC cell of claim 1 wherein said heat shield comprises stainless steel.

17. The AMTEC cell of claim 1 wherein said heat shield includes a preselected emissivity characteristic.

* * * * *